Aug. 30, 1955  K. S. LESTER  2,716,728
PORTABLE ELECTRICAL GENERATORS
Filed Feb. 26, 1953
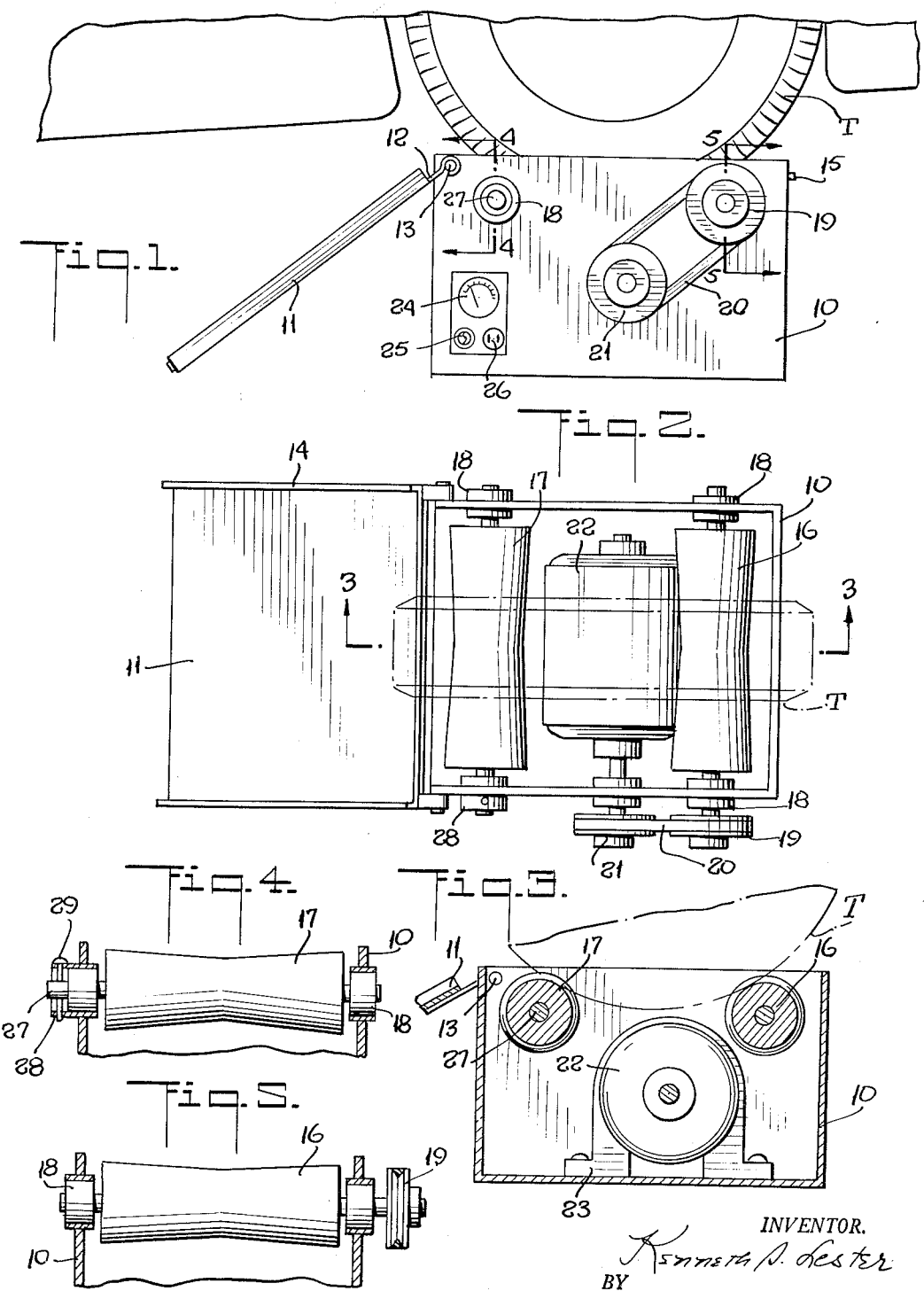
INVENTOR.
Kenneth S. Lester
BY
S. Stephen Baker
ATTORNEY

United States Patent Office 2,716,728
Patented Aug. 30, 1955

2,716,728

PORTABLE ELECTRICAL GENERATORS

Kenneth S. Lester, Mountain Lakes, N. J.

Application February 26, 1953, Serial No. 338,956

3 Claims. (Cl. 322—40)

This invention relates to a portable electric generator powered by an automobile or the like.

According to the instant invention there is provided an electric generating unit to be powered by automobile tire friction as the prime mover. The device is unitary and includes mechanical transmission means which drives the generating unit and which is adapted to receive and support one wheel of a conventional automobile for actuating the mechanical transmission.

In the form shown, the unit comprises a pivoted cover which further serves as an inclined ramp over which the automobile wheel may be driven so as to come to rest on the unit itself. An idler roller is employed in conjunction with a working roller for supporting the automobile wheel in position and means are further provided to prevent rotation of the idler roller for permitting the car to be driven off the unit when the electrical generating action is no longer required.

The invention will be further understood from the following description and drawings in which:

Figure 1 is an elevational view of my portable generator as actuated by the rear wheel of a conventional automobile;

Figure 2 is a top plan view of the unit, the cover being swung back to form a ramp as in Figure 1;

Figure 3 is a cross-sectional view as taken along the lines 3—3 of Figure 2;

Figure 4 is a cross-sectional view as taken along the line 4—4 of Figure 1; and

Figure 5 is a cross-sectional view as taken along the line 5—5 of Figure 1.

The unit comprises a case 10 which is rectangular and of sturdy metallic construction. It is provided with a hinged cover 11 at its forward end, the cover being formed with ears 12 which pivot about the pins 13. The cover 11 is formed with side flanges 14 which embrace the case 10 when the unit is in closed position. When in such position, the cover 11 may be latched to the pin 15 by any conventional means.

The sides of the box rotatably support a pair of rollers 16 and 17. The shaft of each roller is mounted in heavy duty roller bearings 18 which are, in turn, disposed in annular housings as hereinafter described. The respective shafts of the rollers are mounted approximately eight inches apart and the rollers are approximately three inches in diameter so that they are spaced about five inches apart. The rollers, it will be noted, are larger in diameter at their ends than at their centers so that the tire T tends to center itself while rotating. While both rollers are actuated by the wheel, roller 16 is the working roller while the other is an idler roller employed to stabilize the support for the wheel.

The shaft of roller 16 extends outwardly of the case and supports a pulley 19. A belt 20 drives pulley 21 which, in turn, actuates the shaft of the generator 22.

In the form shown, the generator 22 is a continuous duty, 115 volt, 60 cycles alternating current machine. It is secured to the floor of the case by feet 23. The generator machine itself is part of a conventional generator unit which includes a voltmeter 24, a fuse box 25, and a power outlet 26. It is considered unnecessary to describe any of these elements in detail since such generator units are conventional and come equipped with a power outlet, a voltmeter, and a fuse, only the power source being required to actuate it.

In operation of the device, the cover 11 is swung back to the position shown in Figure 1 so that its outer edge rests on the floor. The automobile is then backed slowly up the inclined cover which serves as a ramp. The tire T is then brought to rest on the two rollers 16 and 17. The automobile engine is then permitted to idle in high gear so as to drive the roller 16, the roller 17 serving as a support and rotor. The generator, which may be from about 1000 to 5000 wattage, is accordingly actuated by the mechanical transmission above described and will produce electrical current which can be taken from the power outlet. It will be evident to those skilled in the art that the automobile differential in the rear axle will permit the tire T to rotate while the other rear tire will remain stationary. The speed of the engine may be adjusted manually so as to produce a reading of 115 volts in the voltmeter 24 or any conventional voltage regulating device may be incorporated in the generator unit.

When the unit has served its purpose and is no longer required, the automobile may be driven forward off the rollers. This would be quite difficult if the roller 17 were permitted to rotate. Accordingly, I provide means for locking the front roller 17 against rotation. This is effected in the following manner: It will be noted that each bearing 18 is disposed in an annular housing which is integral with the box sides. The shaft 27 of the roller 17 is formed with a hole therethrough as is the annular bearing housing 28. Accordingly, a pin 29 may be dropped through the registering holes so as to effectively lock shaft 27 with respect to the housing and box and thus prevent rotation of the roller 17. After this pin has been thus inserted, the automobile may be positively and safely driven off the unit.

It will be understood from the foregoing that I have devised a portable, ramp-mounted, automobile-powered generating unit which can serve as an emergency generating device and can be put into operation by the simple expedient of driving an automobile thereon. Accordingly, a home need not fear the consequences of a power line failure as long as an automobile is available so that the instant unit can be put into action.

What is claimed is:

1. A portable generating unit comprising a case, a portable electrical generating unit disposed in said case and a pair of rollers rotatably supported in the sides of said case, said rollers being spaced apart so as to receive the tire of an automobile between them and at least one of said rollers being mechanically connected to said generating unit so as to actuate said unit and produce electrical power therefrom, and a swingable cover for said case, said cover being pivoted to said case at one end thereof and being swingable to a position where its front end rests on a supporting floor so that the cover may serve as a ramp whereby the automobile tire may be driven up the ramp and onto the rollers of the casing.

2. A portable generating unit comprising a case, a portable electrical generating unit disposed in said case and a pair of rollers rotatably supported in the sides of said case, said rollers being spaced apart at the top of the case, ramp means to support the tire of an operating automobile as said tire is driven up to said top whereby said tire may thereafter be jointly supported by said rollers, the first roller at said top being an idler roller and the second roller being a working roller which is mechanically connected to said generating unit so as to actuate said unit and produce electrical power therefrom, said rollers being positioned so that the tire first passes over the idler roller in reaching operating position on the unit and then passes over the working roller, a shaft on said idler roller, said shaft having an opening formed therethrough, a housing on said case in which said shaft is disposed, and said housing being likewise formed with a hole, and a pin adapted to be received in both holes for locking the idler roller relative to the case when the tire is to be driven off of the rollers.

3. A portable generating unit according to claim 2 and wherein said ramp comprises a swingable cover for said case, said cover being pivoted to said case at one end thereof and being swingable to a position where its front end rests on a supporting floor so that the automobile tire may be driven up to the ramp and onto the rollers of the casing.

References Cited in the file of this patent

UNITED STATES PATENTS

| 927,961 | Forker | July 13, 1909 |
| 1,875,237 | Hambley | Aug. 30, 1932 |

FOREIGN PATENTS

| 434,829 | Great Britain | Sept. 10, 1935 |
| 409,571 | Italy | Feb. 21, 1945 |
| 99,282 | Switzerland | June 1, 1923 |